United States Patent [19]

Phillips et al.

[11] 4,030,365

[45] June 21, 1977

[54] DIFFERENTIAL PRESSURE GAUGE

[75] Inventors: James W. Phillips; Terrance J. Troyer, both of Michigan City, Ind.

[73] Assignee: Dwyer Instruments, Inc., Michigan City, Ind.

[22] Filed: June 28, 1976

[21] Appl. No.: 700,131

Related U.S. Application Data

[63] Continuation-in-part of Ser. No. 639,969, Dec. 11, 1975, Pat. No. 4,011,759.

[52] U.S. Cl. .............................. 73/393; 73/407 R
[51] Int. Cl.² .......................................... G01L 7/08
[58] Field of Search ........... 73/407 R, 407 PR, 406, 73/393, 418, DIG. 5; 250/231 P, 209; 116/114 K, 114 PV, 129 R

[56] References Cited

UNITED STATES PATENTS

| | | | |
|---|---|---|---|
| 3,397,319 | 8/1968 | Locke | 73/407 R |
| 3,862,416 | 1/1975 | Phillips et al. | 73/407 PR |

*Primary Examiner*—Donald O. Woodiel
*Attorney, Agent, or Firm*—McWilliams & Mann

[57] ABSTRACT

A differential pressure gauge of the type comprising a controlling magnetic helix device carrying a pressure indicating arm, the position of which is controlled by a magnet mounted on the free end of a cantilevered leaf spring actuated by a pressure diaphragm exposed to differential pressures. The helix cooperates with a magnet having a planar pole face paralleling the axis of the helix and defining a magnetic axis that is normal to and intersects the helix axis. The gauge housing defines an integral one piece pressure wall that separates the helix from the magnet and defines within the gauge housing pressure cavity an operating space within which the magnet and its supporting leaf spring are mounted and operate. Between the helix and the magnet the pressure wall is of film dimensions and is contoured to stress in bending. The leaf spring is mounted on a mounting plate disposed within the pressure cavity and engaging the gauge housing only at its rim for stress isolation purposes. The mounting plate also shiftably mounts an adjustable fulcrum for the leaf spring in the form of a clamp device which may be both positionally adjusted and operated through a common access opening in the housing. The housing includes a zero datum and a device for setting the indicating arm on the zero datum including an adjustment mechanism coupled to the helix and seated on the housing in alignment with the helix axis.

17 Claims, 18 Drawing Figures

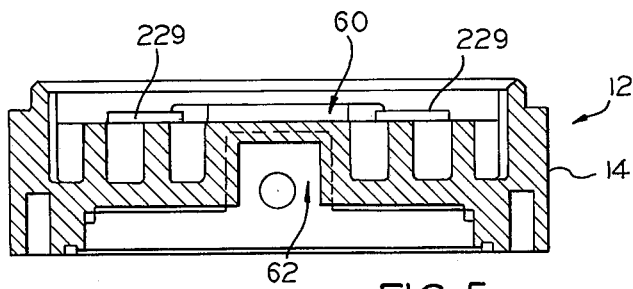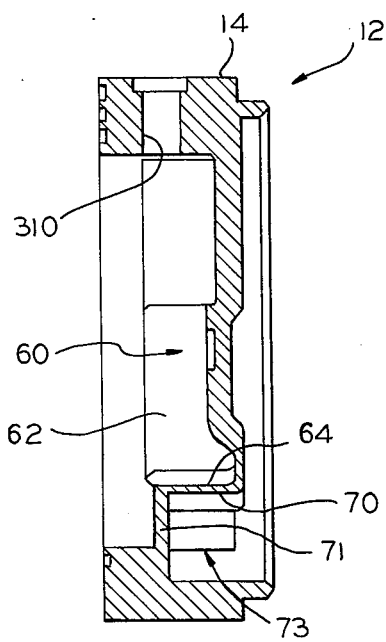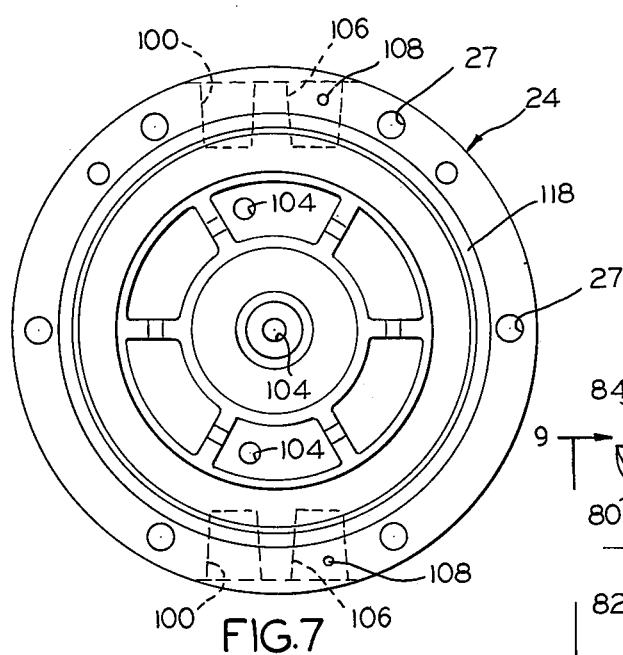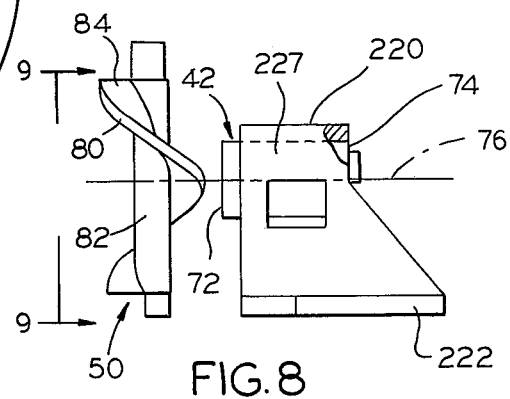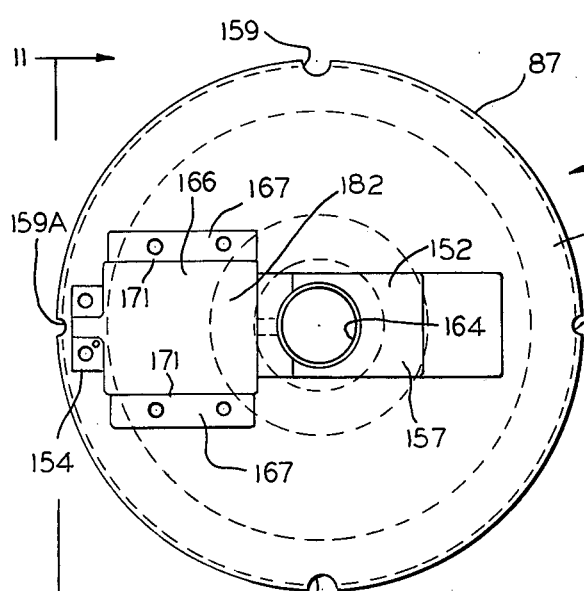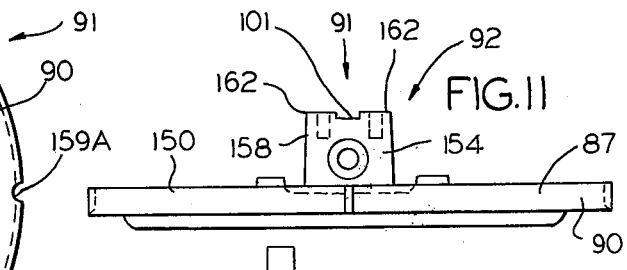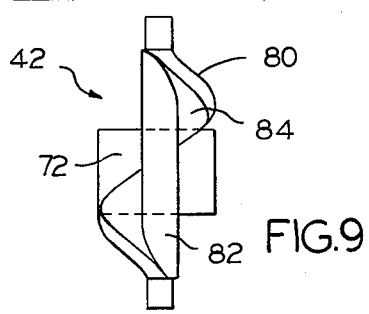

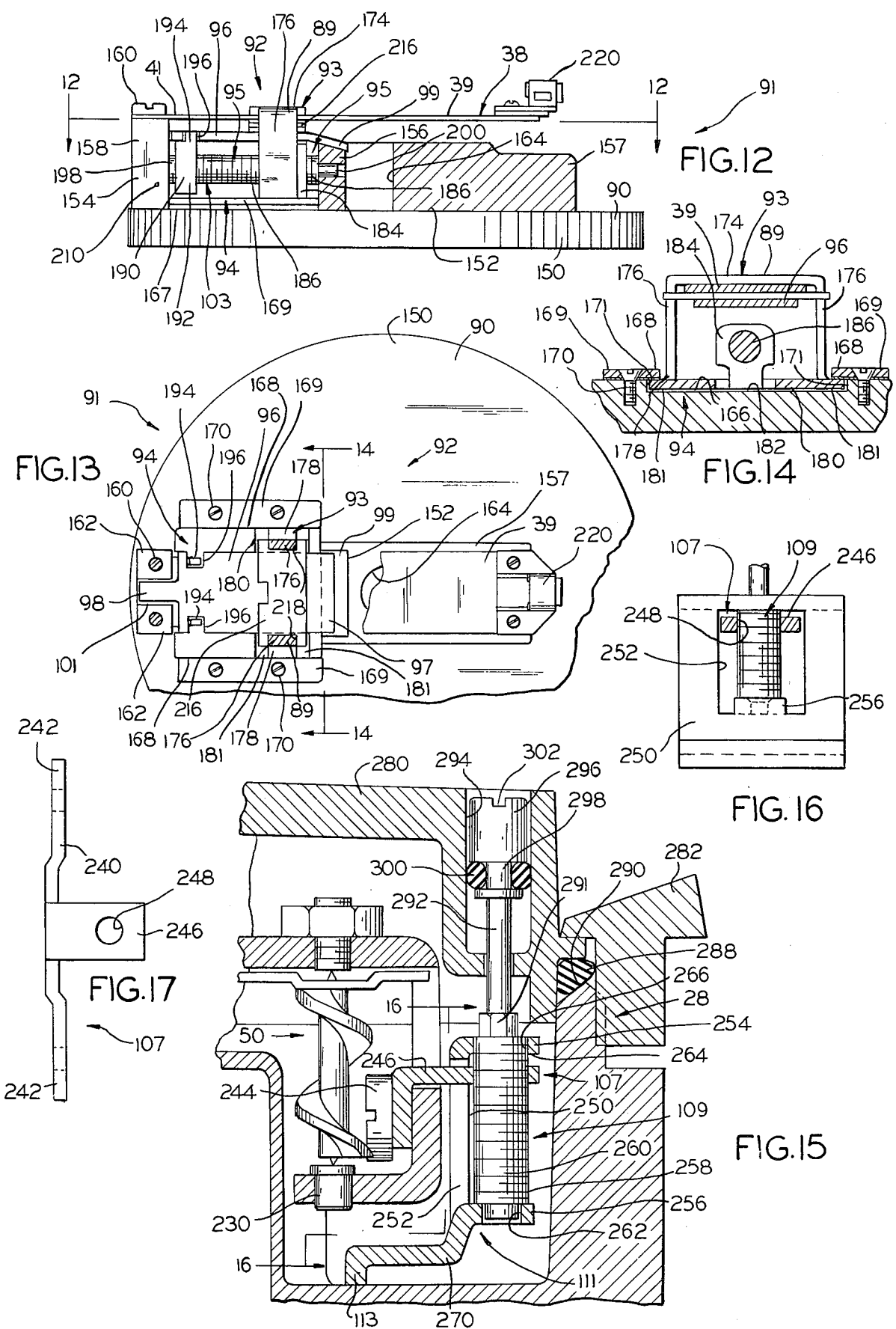

DIFFERENTIAL PRESSURE GAUGE

This application is a continuation-in-part of our application Ser. No. 639,969, filed Dec. 11, 1975 now Pat. No. 4,011,759.

This invention relates to pressure gauges, and more particularly to sealed capsule type differential pressure gauges of the general type shown in Phillips and Zoludow U.S. Pat. No. 3,645,140 that include a flexible diaphragm that is to be exposed to differential pressures to operate a sensitive and accurate motion transmitting indicator device mounted in the capsule.

In the arrangement of said patent, the motion transmitting device is in the form of a pivotally mounted helix cooperating with the magnet to indicate differential pressures and changes therein by movement of the magnet through a linkage connection to the diaphragm. Said patent shows several ways to mount the helix to achieve this end including a range spring mounting arrangement for the magnet that includes an adjustable fulcrum, and a wishbone mounting arrangement for the helix accommodating zero setting of the helix mounted indicator arm. A similar arrangement is shown in Phillips and Zoludow U.S. Pat. No. 3,862,416 relating to a pressure indicator and switch arrangement. The disclosures of these patents are incorporated herein by this reference.

The helix conventionally employed in motion transmitting devices of the type indicated generally involve a double edged helix, that is, one defining oppositely disposed helically contoured flanges or lobes on either side of the helix, cooperating either with a horseshoe magnet that embraces the helix, or a plate type magnet that may have a flux concentrating plate disposed to cooperate with one of the helix edges. As the mass of the helix and the orientation of the magnetic lines of force acting on same are critical aspects of the sensitivity of the device, it is important that these components have such aspects arranged to maximum benefit for improving the sensitivity of the device.

In devices of the general type under consideration, it is desirable to avoid having the helix and its indicating arm operate subject to the higher pressures to which the gauge may be exposed, and thus the helix and operating magnet therefore are ordinarily mounted in the low pressure chamber of the gauge, for instance, as shown in said U.S. Pat. No. 3,645,140. However, where the gauge is to be used in total pressure (applied to the gauge) ranges from 500 to 1,500 psig. or more, both pressure sides of the gauge will be under relatively high pressures requiring special mounting of the helix to keep it in an operating pressure environment that will insure maximum sensitivity and accuracy.

One way of isolating the helix from the gauge high pressure is to mount it in a separate tubular housing that forms a well within the gauge pressure chamber, within which the helix operates but free of the pressure chamber pressures. One such arrangement is shown in Neyer U.S. Pat. No. 3,373,614. However, arrangements of this type involve a separate mounting from the tubular housing that forms the well, as well as journaling of the helix inside the housing, which necessarily involves extra parts and machining and assembly operations that are preferably avoided.

Of course, the range spring and zero set adjustments in devices of this type are critical for acceptable accuracy. A troublesome problem for gauge of this type designed for the high pressure range use is that the adjustment mechanisms involved can be adversely affected due to structural deflections caused by stresses generated in the gauge housing under such pressures.

A principal object of the present invention is to revise the relationship of the helix and magnet, and the mounting of the range spring and zero set mechanisms in gauges of the type indicated, to improve the sensitivity and accuracy of same.

Another principal object of the invention is to provide a differential pressure gauge especially suited for higher total pressure use, in which the helix operates outside of the gauge pressure cavity without requiring the conventional "well" construction.

Another important object of the invention is to provide a differential pressure gauge arrangement for higher total pressure use of improved sensitivity and involving an arrangement of the gauge housing which accommodates disposing the helix exteriorly of the gauge pressure cavity without requiring separate components of special machining for that purpose, and which permits the use of the wishbone type mounting of the helix that is shown in said U.S. Pat. Nos. 3,645,140 and 3,862,416.

Still other objects of the invention are to provide an improved magnetically coupled motion transmitting arrangement for differential pressure gauges, to provide a range spring and zero set adjusting device and mounting arrangements therefor that isolate them from or compensate for deflections due to stresses in the gauge in the higher pressure operating ranges, to provide a differential pressure gauge arrangement for use under pressures of up to 1,500 psig., and to provide a differential pressure gauge that is economical of manufacture, convenient to install and use, and long lived in operation.

In accordance with the invention, a differential pressure gauge is provided comprising a housing arranged to mount the helix on a wishbone for cooperation with a leaf spring mounted magnet, in which the helix is characterized by having a single or double helically contoured side edge disposed for cooperation with the magnet, the latter being in the form of a parallelepiped shaped body presenting a planar pole face disposed in a plane paralleling the pivotal axis of the helix and having a magnetic axis that extends normally of its said pole face, with the magnet being oriented so that its magnetic axis intersects the pivotal axis of the helix at right angles thereto. In the case of the helix with the single helically contoured side edge, the helix and the magnetic pole face are proportioned so that the side edge is substantially aligned, in the plane of the magnet that includes its magnetic axis, with one or the other of the diagonally located pairs of pole face corners. The gauge housing is formed with an integral pressure wall that in part defines the pressure cavity of the housing and separates the magnet from the helix. The magnet and helix are disposed closely adjacent to each other with the portion of the pressure wall separating same defining oppositely disposed concave surfaces between which the pressure wall is of film dimensions to define a closed pressure resisting magnetic flux passing "window" through which the magnetic flux acts on the helix. The pressure wall in question is formed to define a chamber portion within the housing pressure cavity that receives the magnet and accommodates the movement it has to have for devices of the type.

This arrangement accommodates the mounting of the helix exteriorly of the housing pressure cavity without need for the prior art type well (and its disadvantages), while permitting the zero adjust arrangement provided by wishbones of the type shown in said U.S. Pat. Nos. 3,645,140 and 3,862,416 to be employed.

The invention further is concerned with a range spring mounting arrangement for the magnet in which the range spring is mounted on a hanger or mounting plate disposed within the gauge pressure cavity and arranged to isolate the range aspring and magnet from the effect of housing stress due to pressures existing in the pressure cavity. The mounting plate is secured in position by a jam fitting relation about its marginal edging, with the gauge housing, that forms the only contact of the mounting plate with the gauge housing. The range spring mounting arrangement includes a clamping type fulcrum device for the range spring that releasably engages the range spring and may be released for shifting longitudinally of the range spring to change the fulcrum.

The invention is also concerned with a zero set arrangement coupled with the wishbone and seated in the housing at a position where any deflection of the housing under stress of pressures in the pressure cavity will act to compensate for movement of the helix under such stress that would otherwise occur. Other objects, uses, and advantages will be obvious or become apparent from a consideration of the following detailed description and the application drawings.

In the drawings:

FIG. 5 is a sectional view of the gauge housing member per se taken substantially along line 5—5 of FIG. 3;

FIG. 6 is similar to FIG. 5 but taken substantially along line 6—6 of FIG. 3;

FIG. 7 is a plan view of the top or inner side of the base plate, taken along line 7—7 of FIG. 4;

FIG. 8 is a side elevational view taken of the magnet and helix, as viewed from the side opposite that of FIG. 4;

FIG. 9 is a diagrammatic view taken along line 9—9 of FIG. 8 illustrating an important proportioning aspect of the helix;

FIG. 10 is a top plan view of the hanger or mounting plate per se for the range spring and associated parts;

FIG. 11 is an edge view of the hanger plate taken along line 11—11 of FIG. 10;

FIG. 12 is a side elevational view, partially in section, of the hanger plate as equipped with the range spring and its adjustable fulcrum in accordance with this invention;

FIG. 13 is a top plan view of the hanger plate of FIG. 12, with parts broken away;

FIG. 14 is a detail fragmental view taken substantially along line 14—14 of FIG. 13;

FIG. 15 is a fragmental view taken from FIG. 4 and illustrating the zero set device on an enlarged scale;

FIG. 16 is a fragmental section view taken substantially along line 16—16 of FIG. 15; and FIG. 17 is a top plan view of the zero set bracket shown in FIG. 15.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

As the improvements of the present application are closely related to the gauge of our said application, much of the disclosure of said application is repeated herein.

GENERAL DESCRIPTION

Figure 1:
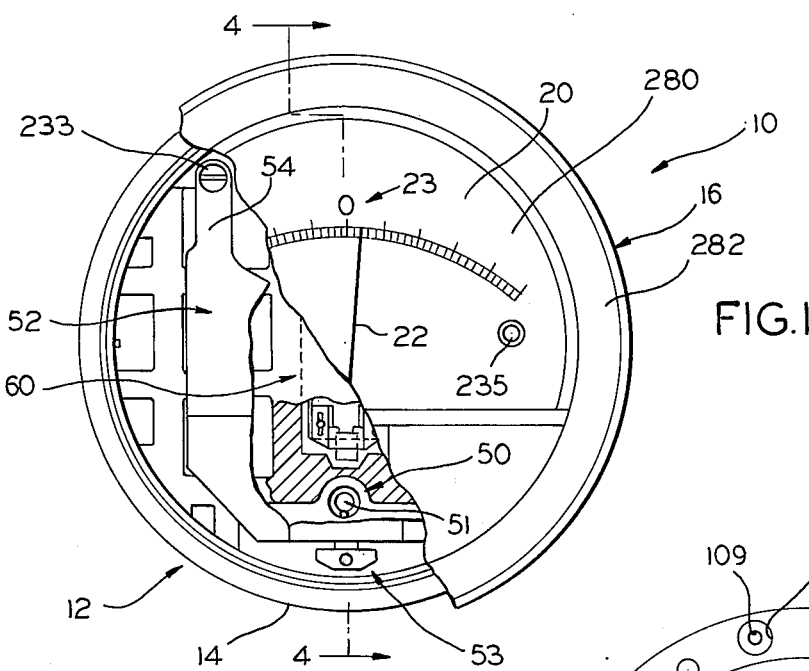
FIG. 1 is a top plan view of one embodiment of the invention, with parts broken away to expose other parts, including the helix and gauge pressure wall, which are shown in plan.
Figure 4:
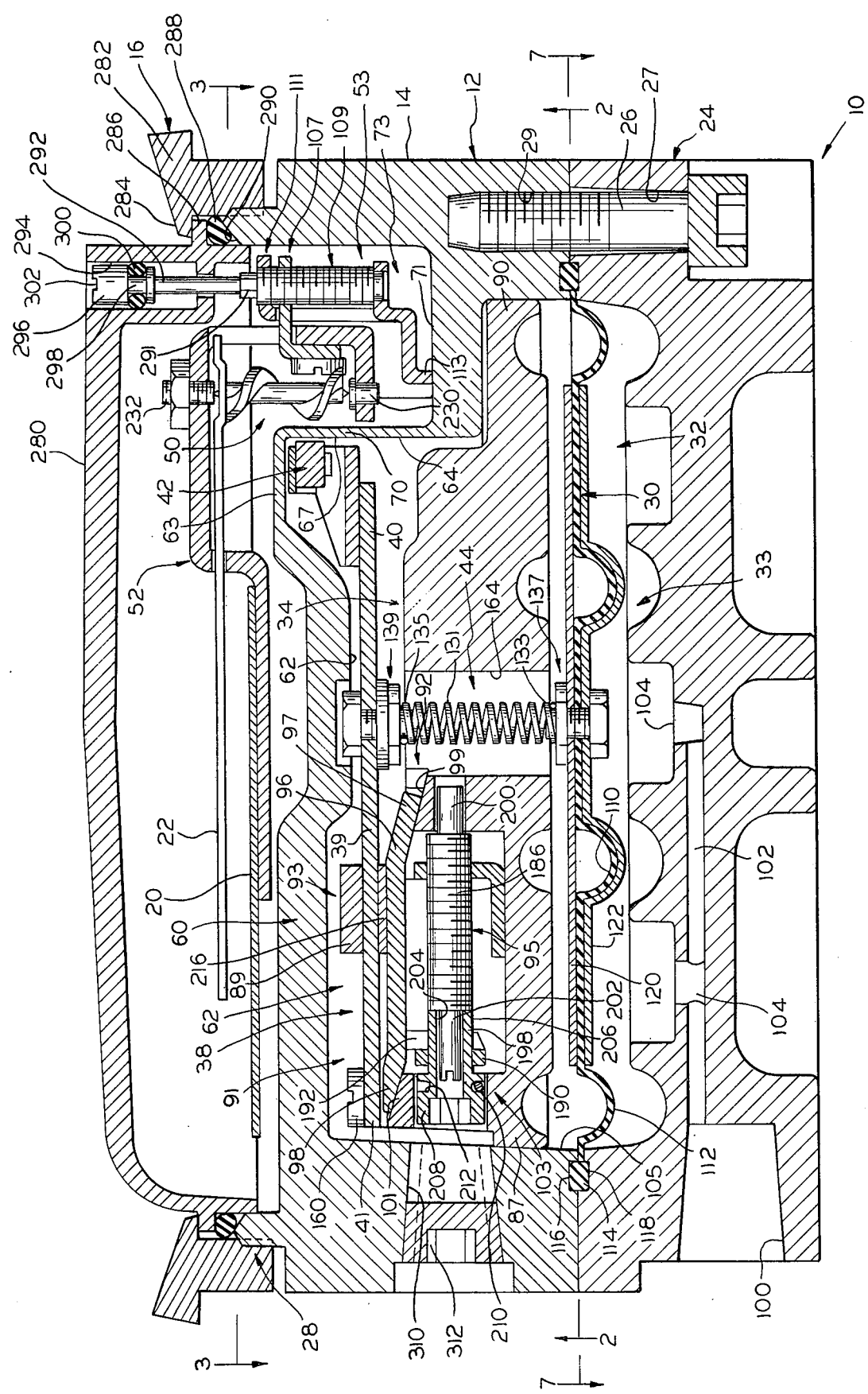
FIG. 4 is a transverse cross-sectional view taken substantially along line 4—4 of FIG. 1.

Reference numeral 10 of FIGS. 1 and 4 generally indicates a differential pressure gauge arranged in accordance with the invention comprising a housing 12 including a housing member 14 that has applied to the front or upper side of same a cover 16 through which is visible the dial plate 20 of the gauge with which the gauge pointer arm 22 cooperates. Dial plate has suitable indicia on same for reading the gauge, including the zero datum mark, diagrammatically illustrated at 23 in FIG. 1.

On the back side of the housing member 14 is a base or back plate 24. The housing member 14 and base plate 24 are in the form of separate castings shaped in the manner indicated in the drawings and adapted for securement together by employing suitable screws 26 received through openings 27 formed in the base plate and threaded into threaded openings 29 of the housing member. The cover 16 is threadedly secured in place where indicated at 28 in FIG. 4.

The gauge 10 is of the general type shown in said U.S. Pat. Nos. 3,645,140 and 3,862,416, and thus includes a diaphragm 30 mounted between the housing member 14 and base plate 24. The housing member 14 and the base plate 24 are shaped to define a pressure cavity 32 across which the diaphragm 30 is mounted to define the pressure cavity 32 into separate pressure chambers 33 and 34 on either side of the diaphragm, with the housing member 14 and base plate 24 being suitably formed to connect the respective chambers 33 and 34 to the sources of differential pressures to be measured by the gauge 10 (chamber 34 being connected to the higher pressure source).

The gauge 10 includes a range spring 38 in the form of leaf spring 39 cantilever mounted, at its end 41, within the cavity 32, and specifically within the chamber 34 to support a magnet 42 (at its end 40) that is of special significance.

The range spring 38 is coupled to the diaphragm 30 by linkage 44 so that variations in pressure in the respective chambers 33 and 34 will be translated, by corresponding movement of the diaphragm 30, into movement of the leaf spring 38 and specifically at the free end 40 of the leaf spring on which the magnet 42 is mounted.

Gauge 10 includes (in its preferred form) a novel single lobe helix 50 journaled for rotation about its longitudinal axis 51 in support frame 52 that forms the so-called wishbone, similar to the corresponding arrangement of U.S. Pat. No. 3,862,416, which support frame is cantilever mounted at its leg portions 54 (see FIG. 1 where only one is shown) to support the helix 50 for movement to the right or left of FIG. 4 relative to the housing member 14.

The pointer arm 22 is suitably fixed to the helix so that when the helix 50 rotates about its longitudinal axis 51, the position of the pointer will change relative to the gauge plate 20 to give a differential pressure reading on the scale indicia there indicated (see FIG. 1). The helix 50 moves in this manner on movement of the magnet 42 upwardly or downwardly of FIG. 4 under the action of differential pressures in the chambers 33 and 34, or on movement of the support frame 52 relative to the housing member 14 by operation of the zero adjust device 53, which is of special contruction in accordance with the present invention, and is used to set the pointer 22 on the dial zero datum mark.

In accordance with the invention, the housing member 14 is formed to define a pressure wall 60 which in part difines the pressure cavity 32 and high pressure chamber 34. More specifically, the pressure wall 60 is shaped to define an elongate chamber portion or recess 62 in which the range spring 38 is disposed when mounted in its operative position. Wall 60 transversely of the chamber portion or recess 62 is of generally U-shaped configuration (see FIG. 5) and adjacent the location of the helix 50, it is indented, on the pressure side of same, as at 63, to receive the magnet 42.

Figure 2:
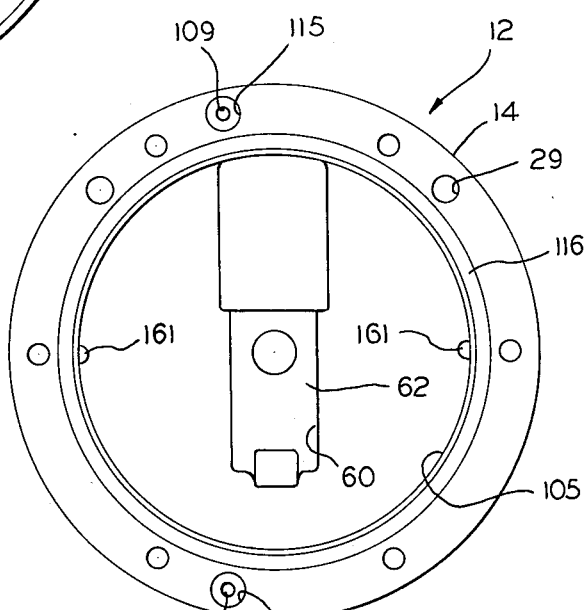
FIG. 2 is a bottom plan view of the gauge housing member, taken along line 2—2 of FIG. 4, with the diaphragm, the range spring, and associated parts omitted.
Figure 3:
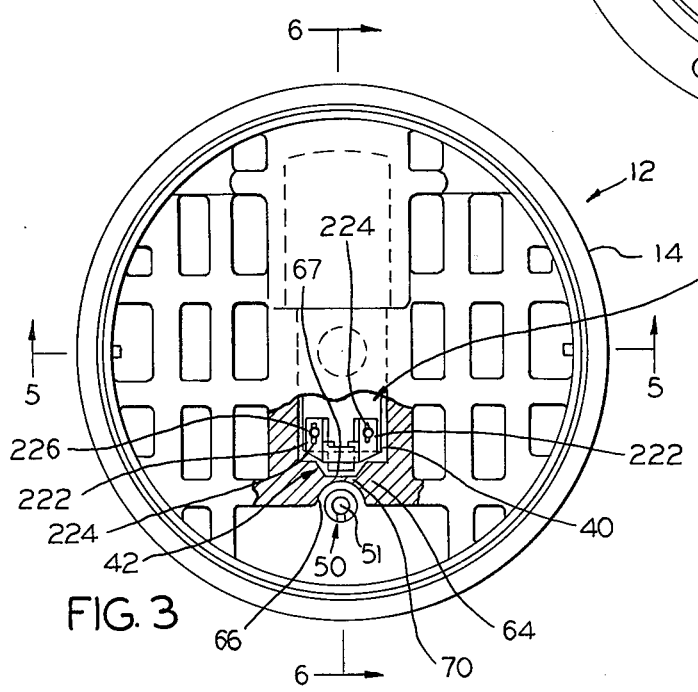
FIG. 3 is a plan view of the top side of the gauge housing member, looking in the direction of the arrows of line 3—3 of FIG. 4, with the housing cover, the indicator scale and helix pointer arm, and the wishbone and other associated parts omitted, but showing the helix disposed in its operating position in a diagrammatic manner.

Adjacent the indentation 63 pressure wall 60 defines a special cross wall portion indicated at 64 that has the general cross-sectional configurations indicated in FIGS. 2, 3, and 6 whereby the wall portion 64 is formed to define an external concavely rounded indentation or recess 66 in which the helix 50 is disposed. Wall portion 64 within the recess 62, and thus within the pressure chamber 32, defines concavely rounded indentation 67 into which the magnet 42 extends for cooperation with the helix 50.

As brought out in FIGS. 2, 4, and 6 the concavely rounded indentations 66 and 67 are elongate lengthwise of the helix and extend in substantial parallelism longitudinally of the axis 51 of rotation of the helix. The indentations 66 and 67 shape the pressure wall portion to define a segment 70 of film proportions or dimensions which acts as a magnetic flux passing "window" through which the magnetic flux of the magnet 42 acts in controlling the position of the helix 50.

As clearly shown in the drawings, the pressure wall segment 70 is fully integral with the pressure wall 60 about the segment 70. Pressure wall 60 adjacent the base of segment 70 merges integrally with the recessed ledge or shelf 71 that is defined by the housing member 14 to form the operating space 73 in which the helix 50 and associated parts are to be disposed. Indentation 66 is preferably shaped such that it encompasses no more than about one-half the circumference of the helix 50.

Further in accordance with the invention, the magnet 42 is of parallelepiped configuration defining oppositely facing pole faces 72 and 74 (see FIG. 8) that are planar in configuration; magnet 42 is disposed to have the planes of pole faces 72 and 74 disposed parallel to the axis 51 of pivotal movement of the helix 50. The magnet 42 is magnetized to define a magnetic axis 76 which extends perpendicular to the respective pole faces 72 and 74 and through which the magnet magnetic lines of force are oriented. The magnet 42 is mounted so as to dispose its magnetic axis 76 in substantial right angled intersecting relation to the helix pivotal axis 51. The magnet pole faces the helix may be either a south pole or a north pole of the magnet, in which case the opposing pole face 74 is of opposite polarity.

Of course, the materials from which the housing member 14, base plate 24, and bezel 282 are formed are of the non-magnetic type, such as aluminum or brass or alloys of same that are non-magnetic.

Further in accordance with the invention, the helix 50 is formed to define a single or mono-helical edge 80. In the form shown (see FIGS. 4 and 8), the helix 50 generally comprises a cylindrical spindle portion 82 having a single spirally contoured flange or lobe 84 that defines the helical edge 80. Helix 50 is formed from a suitable magnetic material, such as steel.

In accordance with the single lobe helix embodiment of the invention, the helix 50 and magnet 42 are disposed so that the edge 80 of the flange of lobe 84 is oriented diagonally of (see FIG. 10), and is spaced approximately 0.060 inch from, the pole face 72, and the pressure wall segment disposed therebetween has a minimum thickness in the range of from approximately 0.030 inch to approximately 0.040 inch.

As indicated in FIGS. 3 and 8, the helix flange 84 is a 360° turn to make the helix mass balanced. The magnetic lines of flux emanating from the magnet face 72 are concentrated on the flange 84 and by reason of its close and balanced disposition relative to the pole face, and because there is no second flange to detract from the magnetic attraction involved, the magnetic coupling of the helix to the magnet is singularly effective.

Our said application may be referred to for further description of the specifics of the helix 50 and its relation to the magnet 42 (the disclosure of said application is hereby incorporated herein by this reference).

Figure 3A:
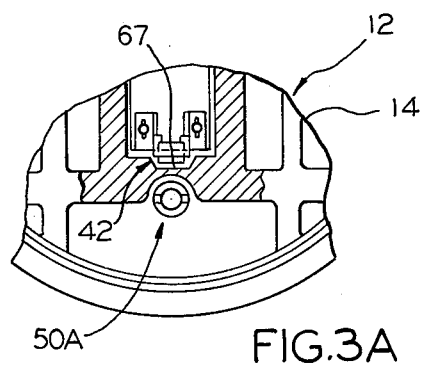
FIG. 3A is a fragmental view corresponding to that of FIG. 3 but showing a modified embodiment.

While the single lobe helix 50 is preferred, the general arrangement involved provides significant advantages using a double lobe helix; FIG. 3A is illustrative of such an arrangement, showing double lobed helix 50A of like diameter and convolution, substituted for the single lobe helix 50, with all other parts being the same.

With reference to FIGS. 4 and 10 -14, the present invention contemplates that, instead of the range spring 38 being mounted in its operating position by being fixed directly to housing member 14, the range spring is mounted on a separate hanger or mounting plate 90 that is disposed within the pressure cavity 32 (see FIG. 4), and is free of connection with the housing member 14 except about the marginal edging 87 of plate 90.

Thus, the range spring 38 and hanger or mounting plate 90 comprise a range spring assembly 91, which also includes spring rate adjusting device 92 for calibrating the range spring including clamp device 93 that comprises U-shaped clamping member 89 that is received over leaf spring 39 and is movable along track way 94 by drive device 95, and a clamp lock member 96 having ramped ends 97 and 98 cooperating with ramps 99 and 101 of plate 90, when moved by drive device 103, to set the clamp device 93 against the leaf spring 39 at the desired location for the range spring fulcrum. When clamp lock member 96 is loosened by actuating drive 103, clamping member 93 may be shifted longitudinally of the range spring to shift its fulcrum as desired.

The mounting plate 90 is mounted in cavity 32 by forming the cavity 32 to define a circumambient side or rim wall 105 that is of frusto-conical configuration (converging in the direction of the pressure wall recess 62), with which the marginal edging 87 of plate 90 makes a complementary fit for pressure wedge fitting of the plate 90 within cavity 32, and free of any other connection of the plate 90 to housing member 14.

This arrangement isolates the range spring 38 from the housing member 14, and thus avoids adverse results on the range spring as the housing member 14 deflects under high pressures in the pressure cavity 32.

The zero adjust device 53 is also arranged to avoid adverse results due to deflection of housing member 14 under high pressures in cavity 32, and comprises bracket member 107 secured to wishbone frame 52 (see FIGS. 4 and 15) and threadedly receiving adjusting screw 109 that is supported by support member 111 having a foot 113 engaging the housing shelf 71 in substantial alignment with the axis 51 of helix 50.

Thus, any deflection of the housing member 14 in the area of shelf 71, under the stress of high pressures in cavity 32, will act to compensate for corresponding movement of the helix that might occur due to deflection of the portion of housing member 14 to which frame 52 is connected.

In operation, the high and low pressure connections of the gauge are suitably connected to sources of high and low pressures which apply differential pressures on the diaphragm 30, with the resulting deflection of the diaphragm moving the leaf spring 38 through linkage 44 to shift the magnet 42 proportionately, thereby achieving a corresponding pivotal action of the helix 50. As the magnetic flux tends to keep the helix flange 84 in the closely spaced relation to the magnetic pole face 72 that is indicated in FIGS. 3, 4 and 8, movement of the magnet 42 longitudinally of the helix pivotal axis will result in pivotal movement of the helix 50 to thereby change the position of the helix indicating arm relative to the dial plate 20, due to the magnetic coupling involved, but without changing the position relationships disclosed in our said application.

The pressures in the high pressure chamber 34 are fully shielded from the helix 50, while at the same time the proportioning of the pressure wall portion 70 accommodates transmission of the magnet lines of flux therethrough for the desired magnetic coupling effect on the helix 50. The film dimensions of the pressure wall portion 70 are possible due to the rounded configurations of indentations 66 and 67 and the unitary connection that wall segment 70 has with the basic pressure wall 60. The shaping of the parts involved results in the wall portion 70 being placed in bending under the pressures within the chamber 34, thereby avoiding undue stress on the magnetic window of the pressure wall.

Where the housing member 14 and base plate 24 are formed from aluminum, the housing member 14 accommodates total pressures as high as 1000 psi. By utilizing high strength alloys such as manganese bronze or aluminum bronze higher total pressure may be obtained.

While the indicated arrangement of magnet 42 and helix 50 are especially well suited in connection with gauges of the type formed with indicated pressure wall 60, their effectiveness as a motion transmitting coupling is fully usable in gauges of the type shown in said U.S. Pat. Nos. 3,645,140 and 3,862,416, as will be apparent to those skilled in the art.

As indicated, the range spring assembly 91 is isolated from housing member 14, and thus is substantially free of adverse effects due to housing deflection under the stress of high pressures in cavity 32. In addition, the zero adjust device 53 is arranged to utilize any deflection of housing member 14 at shelf 71 to compensate for any movement of the helix due to deflection of the housing portion to which the helix support frame 52 is connected.

SPECIFIC DESCRIPTION

The housing member 14 and the back plate 24 are formed in any suitable manner to the shapes indicated in the drawings, suitable casting procedures being employed in a preferred embodiment. These components may be formed with suitable reinforcing webbing, and the like for providing the desired structural integrity, such as that illustrated.

In the form shown, the high and low pressure connections are made to the base plate 24, the base plate being formed, in the form shown, with a pair of oppositely disposed threaded sockets 100 (see FIGS. 4 and 7) each communicating with a low pressure passageway 102 which communicate with the low pressure chamber 33 through the respective ports 104. Similar threaded sockets 106 communicate directly with high pressure passageway 108 that suitably communicates, as through an O-ring seal (not shown but interposed between member 14 and base plate 24 as by being lodged in recess 115, see FIG. 2, of member 14) with a correspondingly located passageway 109 in housing member 14 suitably communicating with the high pressure chamber 34.

The diaphragm 30 is formed a suitable elastomeric material and defines an inner annular flexing indentation 110, an outer annular flexing indentation 112, and a marginal rim 114 of O-ring configuration that is received between the housing member 14 and base plate 24, and within their respective annular recesses 116 and 118 that oppose each other in the assembled relation of the gauge.

In the form shown in the drawings, the diaphragm 30 has its inner indentation 110 made rigid by front plate 120 and back plate 122 for low pressure applications. The outer indentation 112 alternately may be made rigid in a similar manner for higher differential pressure range applications.

The diaphragm 30 may be formed with suitable reinforcing ribs and headed studs for frictional application to openings in the illustrated diaphragm plates, in the manner disclosed in said U.S. Pat. No. 3,645,140.

Linkage 44 comprises tension spring 131 having its ends 133 and 135 seated against suitable spring seats 137 and 139 secured to the diaphragm and range spring respectively; the spring seat 137 is conveniently in the form of a screw and nut clamping device to clamp the diaphragm in leakage free relation between plates 120 and 122. Spring seat 139 is similarly arranged to clampingly engage leaf spring 39. The ends of spring 131 are suitably secured to seats 137 and 139, as by having threaded into them the ends of the screws involved in spring seats 137 and 139.

The hanger or mounting plate 90 of the range spring assembly 91 comprises a one piece disc member 150 including integral upstanding pedestals 152 and 154, the upstanding ends 156 and 158 of which are respectively suitably formed to define the respective ramp surfaces 99 and 101. Disc member 150 is notched as at 159 to receive centering lugs 161 of housing member 14. Similar notches 159A form vent opening along the marginal edging 87 of plate 90.

As indicated in FIGS. 4 and 12, the leaf spring 39 is affixed at its end 41 to pedestal 154 by applying appropriate screws 160. For this purpose, the projecting end 158 of the pedestal 154 is bifurcated to define a pair of spaced apart terminal end portions 162 spaced apart by the ramp 101 on which the ramped end 98 of lock member 96 rides.

The leaf spring 39 is disposed to extend diametrically across mounting plate 90 and overlie pedestal 152 as well as the central opening 164 formed in the mounting plate 90 through which the linkage 44 extends for connection to the diaphragm 30.

As indicated in FIG. 14, the track way 94 comprises a general channel shaped construction defining a web portion a quadrilateral recess 166 formed in member 150 extending longitudinally of the leaf spring 39, and having lands 167 formed on either side of same on which the respective hold down plates 169 are mounted by employing suitable screws 170. Plates 169 define opposed edge portions 168 overlying the sides 171 of recess 166 under which the clamp member 89 is slidably engaged. The track way 94 thus parallels the leaf spring 39, with its plates 169 being disposed in coplanar relation and in substantial parallelism with the plane of the plate 90.

The clamp member 89 is of "U" configuration defining planar web portion 174 that engages the upwardly facing surface of the leaf spring 39, and a pair of depending arm portions 176 each having an out-turned end portion 178 which fits under a corresponding edge portion 168 of the respective hold down plates 169 for slidingly mounting the clamp member 89 in operative engagement within the trackway 94, for both movement therealong, as well as for clamping relation with the leaf spring 39 in cooperation with lock member 96.

Nut member 184 is part of drive device 95 and threadedly receives drive screw 186 (of the drive 95), which is journaled for rotation between the mounting plate pedestals 152 and 154; nut member 184 has a foot portion 180 riding in recess 166 and having bifurcated end portions 181 within which the clamp member out-turned end portions 178 respectively fit to key nut member 184 to clamp member 89 for movement therewith. The floor 182 of recess 166 along which foot portion 180 moves is coplanar with disc member 150.

The clamp lock member 96 is moved to the right or to the left of FIG. 4 by drive device 103 which comprises nut member 190 having on either side of same angled side portions 192 formed with upwardly projecting end portions 194 lodged in the respective notches 196 formed on either side of the lock member 96 (see FIGS. 12 and 13). Nut member 190 is threadedly received on screw member 198 (see FIG. 4) that is likewise journaled between the pedestals 152 and 154 of the mounting plate 90.

In the form shown, the screw member 186 has an end portion 200 journaled in pedestal 152, and has a head portion 202 received in close fitting relation within the bore 204 of screw member 198 that is made tubular for this purpose. The screw member 198 thus has its externally threaded shank 206 journaled on the head portion 202 of screw member 186, and has a head portion 208 that is journaled in the pedestal 154. The head 208 of the screw member 198 is keyed in its operating position by suitable pin 210 applied to pedestal 154 and lodged in the annular groove 212 that is formed in the head 208 of screw member 198.

The screw members 186 and 198 turn independently of each other, the head portion 202 of screw member 186 being slotted for application thereto of a suitable turning tool and with the head portion 208 of the screw member 198 being socketed for application thereto of a suitable turning tool. Screw member 198 is actuated to move the lock member 96 to the right of FIG. 4, and thus down the ramp surfaces 99 and 101, to release the range spring for shifting of its fulcrum, when so desired, and the screw member 198 is turned in the opposite direction to move the lock member 96 to the left of FIG. 4 to also move it normally of the plane of mounting plate 90 for clamping relation with leaf spring 39.

Screw member 186, when the clamp device 93 is released, is turned to shift the clamp member 89 longitudinally of the leaf spring as needed to shift the leaf spring fulcrum for calibration purposes. When the desired positioning is reached with regard to the leaf spring fulcrum, screw member 198 is actuated to lock the clamp device 93.

In the form shown, the clamp device 93 includes one or more spacers 216 interposed between the lock member 96 and the underside of the leaf spring 39. The number of spacers employed in any specific embodiment will vary with the thickness of the leaf spring 39 to provide for height adjustment in the clamp device 93. As indicated in FIGS. 12 and 13, the spacers are each slotted at their respective ends, as at 218, which slots 218 receive the respective arm portions of the clamp member 89 so that the spacers 216 move with the clamp member 89 when the clamp member 89 is shifted longitudinally of the track member 94.

The range spring assembly 91 includes the magnet 42 that in the form illustrated is mounted in a bracket 220 (see FIGS. 12 and 13) of generally U shaped configuration defining a pair of spaced apart mounting flanges 222 suitably apertured as at 224 to receive mounting screws 226 that secure the bracket 220 to the leaf spring 39. The bracket 220 defines a magnet housing portion 227 in which the magnet 42 is suitably seated and retained in place, as by bonding or the like. Further specifics of the magnet mounting bracket are disclosed in our said application.

The magnet 42 is preferably formed from a suitable high energy product material, such as the samarium cobalt (using powdered metal formulation techniques) product sold under the trademark HICOREX by Hitachi Magnetics Corp. of Edmore, Michigan. An energy product in the range of from about 14 to about 18 million gauss . oersteds is preferred.

The helix support frame 52 preferably is of the type disclosed in said U.S. Pat. No. 3,862,416, and preferably journals the helix 50 between fixed bearing 230 and adjustable bearing 232. The frame leg portions 54 are secured to housing member pedestals 229 (see FIG. 5) by suitable screws 233. The dial plate 20 is secured to frame by suitable fasteners (not shown); pointer stops 235 (see FIG. 1) may be used as desired. Support 52 is arranged to, when secured in its operating position, provide a spring biasing action on the zero adjust support member 111, biasing it against the housing shelf structure 71.

Operably associated with support frame 52 is the zero adjust device 53. Referring more specifically to FIGS. 15 – 17, it will be seen that the bracket member 107 comprises an elongate mounting portion 240 having its opposite end portions 242 secured to the frame 52 by appropriate screws 244. Integral with elongate portion 240 is nut portion 246 that is disposed at right angles to the elongate portion 240 and threadedly receives screw member 109 in its threaded opening 248.

The zero adjust support member 111 has a body portion 250 that is generally planar in configuration and is centrally apertured to define a quadrilaterally contoured window 252 through which the nut portion 246 of bracket member 107 extends for application to screw member 109.

The support member 111 is shaped to define a pair of upper and lower tabs 254 and 256 that are disposed at right angles to the body portion 250, and are thus in parallelism (see FIG. 15). Screw member 109 has the lower end 258 of its threaded portion 260 journaled in the journaling aperture 262 of tab portion 256, while the upper end 264 of threaded portion 260 is non-threadedly received through guide aperture 266 formed in the tab 254.

The foot 113 of support member 111 is integral therewith by way of an appropriately shaped connecting portion 270. As indicated, it is preferable that the foot 113 be disposed adjacent to the location of the axis 51 of the helix 50 (or 50A), and in engagement with the housing shelf structure 71; the action of high pressures in the pressure cavity 32, and particularly within the high pressure chamber 34, in deflecting the portion of the housing to which the frame 52 is connected will also deflect the shelf portion 71 a corresponding amount in the same manner; thus any movement tendencies of the helix due to the deflection of the housing under such pressure are automatically compensated for.

The cover 16 comprises a cover member 280 formed from a suitable transparent material and held in place by an annular clamp member or bezel 282 threadedly secured to the housing member 14 where indicated at 28. The flange portion 284 of the bezel 282 engages the flange 286 of the cover member for this purpose, to hold same against a suitable O-ring seal 288 that in turn bears against sealing surface 290 defined by the housing member 14.

In the form shown, the zero adjust screw member 109 includes upstanding shank portion 292 integral therewith that is internally hex socketed to receive hex shaped end portion 291 of spindle 292, the latter extending into cylindrical bore 294 formed in the cover member 280. The spindle 292 is formed with a head portion 296 that is suitably grooved as at 298 to receive suitable O-ring seal 300 that is in sealing relation with the bore 294; the head 296 is appropriately slotted as at 302 for application thereto of a suitable turning tool.

The housing member 14 is provided with an internally threaded opening 310 of frusto-conical configuration providing access to the range spring assembly 91. The access opening 310 is closed by suitable threaded plug 312 suitably arranged for sealing off the housing at the aperture 310. Of course, when only one set of the threaded openings 100 and 106 are to be connected to the sources of fluid under pressure, the other set are suitably sealed by using suitable sealing plugs.

The range spring assembly 91 may be pre-assembled as a subassembly, and the wedge or plug fit of the plate 90 within cavity side wall 105 effected by pressing the plate into place as needed. The adjustments built into assembly avoid the need for precise fitting of this part since the range spring is in its operating position.

The cavity 32 and associated parts are proportioned such that chambers 33 and 34, in the assembled condition of the gauge 10, are of equal or substantially equal volumes for similarity of response using either gases or liquids. For this purpose, the hanger plate 90 on its pressure side is shaped to define a protuberance in the form of ridge 157 that parallels spring 39 and is proportioned to reduce the volume of chamber 34 to make its volume substantially equal to that of chamber 32. Ridge 157 in the form shown is integral with pedestal 152 and has opening 164 formed therethrough. In a commercial embodiment of the invention each chamber has a volume of approximately 1.5 cubic inches, but this sizing may be varied to suit particular applications. Ridge 157 is sized to occupy the space within chamber 34 that will result in the volume of chamber 34 equaling, or substantially equaling, the volume of chamber 32.

The foregoing description and the drawings are given merely to explain and illustrate the invention and the invention it not to be limited, since those skilled in the art who have the disclosure before them will be able to make modifications and variations therein without departing from the scope of the invention.

We claim:

1. In a gauge that includes linear to rotary motion transforming means including a housing, a helix in the housing journaled for rotation about its axis, with the helix having an indicator connected thereto, a magnet in the housing for producing rotational movement of said helix in response to linear movement of the magnet alongside the axis of the helix, said magnet being mounted on a leaf spring member secured within the housing cantilever fashion at one end of said spring member, with said spring member being disposed to extend generally transversely of the axis of said helix and with said helix aligned with said spring member, said magnet being mounted on said leaf spring member adjacent to and in magnetic attraction relation to said helix, sensing means connected to said spring member to shift said magnet substantially parallel to the axis of said helix and comprising a flexible diaphragm mounted across a pressure cavity formed by the housing and separating high and low pressure chambers in the gauge, and an adjustment device for adjusting the spring rate of said spring member, the improvement wherein:

the housing between the diaphragm and the spring member defines a rim wall in circumambient relation about the cavity, and including a mounting plate secured in said housing within said rim wall and contacting the housing only at said rim wall, said leaf spring member being mounted on said mounting plate at said one end of said spring member and the magnet being adjacent the other end of said spring member, a fulcrum for said spring member engaging said spring member intermediate said ends of said spring member and mounted on said mounting plate for adjustment longitudinally of said spring member, and means for moving said fulcrum longitudinally of said spring member.

2. The improvement set forth in claim 1 wherein said moving means comprises:
means for actuating said moving means from externally of said housing and mounted on said mounting plate.

3. The improvement set forth in claim 1 wherein:
said mounting plate is secured in said housing by being in jam fit relation with said housing rim wall.

4. The improvement set forth in claim 1 wherein:
the gauge includes a zero datum adjacent the indicator,
and including means for setting the indicator on said zero datum,
said setting means comprising:
a support for said helix mounted in said gauge for movement longitudinally of said axis,
and an adjustment machanism mounted in said gauge and coupled to said helix support,
said adjustment mechanism including:
means for holding said support against movement longitudinally of said axis,
and means for selectively moving said support longitudinally of said axis in either direction.

5. The improvement set forth in claim 4 wherein said setting means selectively moving means includes means for actuating same externally of said housing.

6. The improvement set forth in claim 1 wherein said fulcrum comprises:
a clamp device including means for releasably clamping the spring member,
and means for actuating said clamping means from externally of said housing.

7. The improvement set forth in claim 6 including:
means for actuating said moving means from externally of said housing and mounted on said mounting plate.

8. The improvement set forth in claim 7 wherein:
said clamping means actuating means and said moving means actuating means each include threaded means,
with the respective threaded means being in coaxial telescoped relation with common journalling means on said mounting plate.

9. The improvement set forth in claim 7 wherein:
said leaf spring member, said fulcrum, and said moving means are isolated from said housing, 10. The improvement set forth in claim 4 wherein:
said housing defines a shelf overlying said mounting plate and the cavity and aligned with said axis,
said adjustment mechanism being seated on said shelf adjacent said axis and being free of connection to said mounting plate.

11. In a gauge that comprises a differential pressure capsule having a pressure cavity in which is mounted a flexible diaphragm separating high and low pressure chambers, said capsule including a housing in which a helix is journaled for rotation about its axis, with the helix having an indicator connected thereto and a magnet for producing rotational movement of said helix in response to linear movement of said magnet alongside the axis of the helix, and a zero datum adjacent to which the indicator is disposed, said magnet being mounted on a leaf spring member secured with the housing cantilever fashion at one end of the spring member, said leaf spring member being disposed to extend generally transversely of the axis of said helix with said helix aligned with said spring member, said magnet being mounted on said leaf spring member a magnetic attraction relation to said helix, and with the diaphragm being connected to said spring member to shift said magnet substantially parallel to the axis of said helix on changes of pressure in one or more of said chambers, and an adjustment device for adjusting the spring rate of said spring member, the improvement wherein:
the housing between the diaphragm and the spring member defines a rim wall in circumambient relation about the cavity,
and including a mounting plate secured in said housing within said rim wall and contacting the housing only at said rim wall,
said leaf spring member being mounted on said mounting plate at said one end of said spring member and the magnet being adjacent the other end of said spring member,
a fulcrum for said spring member engaging said spring member intermediate said ends of said spring member and mounted on said mounting plate for adjustment longitudinally of said spring member,
and means for moving said fulcrum longitudinally of said spring member,
said spring member and said fulcrum being free of connection to said housing.

12. The improvement set forth in claim 11 wherein said moving means comprises:
means for actuating said moving means from externally of said housing.

13. The improvement set forth in claim 11 wherein:
said mounting plate is secured in said housing by being in jam fit relation with said housing rim wall.

14. The improvement set forth in claim 11 including:
means for setting the indicator on said zero datum,
said setting means comprising:
a support for said helix mounted in said gauge for movement longitudinally of said axis,
and an adjustment mechanism mounted in said gauge and coupled to said helix support,
said adjustment mechanism including:
means for releasably holding said support against movement longitudinally of said axis,
and means for selectively moving said support longitudinally of said axis in either direction.

15. The improvement set forth in claim 14 wherein:
said housing is formed to define a pressure wall structure of non-magnetic material separating said pressure cavity from said helix and forming a pressure chamber portion in which said magnet is disposed,
said wall structure having a portion disposed between said helix and said magnet that is elongate longitudinally of the axis of said helix and defines a non-magnetic medium that separates said helix from said magnet,
said wall portion defining opposed concave surfaces extending longitudinally of the helix axis respectively facing the magnet and the helix,
said wall portion being integral with said wall structure about its margin, and between said concave surfaces, with said wall portion being of film dimensions,
said wall structure on either side of said wall portion being of relatively thick dimension laterally thereof for bracing said wall portion against the action of pressures in said chamber portion.

16. The improvement set forth in claim 1 wherein:
said mounting plate is in said pressure chamber, said mounting plate including protuberance means proportioned to occupy the space within said pressure chamber that makes the volume of said pressure chamber substantially equal to the volume of said low pressure chamber.

17. The improvement set forth in claim 16 wherein: said mounting plate is substantially parallel said diaphragm,
said protuberance means comprising a ridge underlying and substantially paralleling said leaf spring member.

* * * * *

UNITED STATES PATENT OFFICE
CERTIFICATE OF CORRECTION

Patent No. 4,030,365        Dated  June 21, 1977

Inventor(s)   JAMES W. PHILLIPS and TERRANCE J. TROYER

It is certified that error appears in the above-identified patent and that said Letters Patent are hereby corrected as shown below:

Column 1, line 68, "gauge" should be --gauges--; Column 2, line 32, between "gauge" and "in" insert --housing--; Column 6, line 8, between "pole face" and "faces" insert --72-- that--; Column 13, line 68, "a" should be --in--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*